United States Patent

Wherry et al.

[15] 3,682,278
[45] Aug. 8, 1972

[54] TRAILER HITCH AND BRAKE ACTUATOR

[72] Inventors: Joseph L. Wherry, Perrysburgh; Eugene DeAngelis, Toledo, both of Ohio

[73] Assignee: Toledo Stamping & Manufacturing Company, Toledo, Ohio

[22] Filed: Jan. 28, 1971

[21] Appl. No.: 110,731

[52] U.S. Cl. ............................... 188/112, 60/54.5 R
[51] Int. Cl. ................................................. B60t 7/20
[58] Field of Search....... 60/54.5 R, 54.6 A, 54.6 HA; 188/3 H, 112, 142; 280/428; 303/7

[56] References Cited

UNITED STATES PATENTS

| | | | |
|---|---|---|---|
| 2,848,074 | 8/1950 | Puddy | 188/112 |
| 2,993,568 | 7/1961 | Henry | 188/112 |
| 3,505,815 | 4/1970 | Wherry | 188/112 X |

Primary Examiner—Duane A. Reger
Attorney—Allen D. Gutchess, Jr.

[57] ABSTRACT

A trailer hitch is provided with a brake actuator which supplies hydraulic fluid at large volume and under high pressure to brakes of a towed vehicle. By supplying a large volume of brake fluid to the brakes, large brakes and worn brakes can be effectively accommodated by the actuator. By supplying the fluid at high pressure, the actuator also is capable of use with large or heavy trailers and with disc brakes, for which high pressure is particularly desirable. To accomplish both large volume and high pressure, the actuator includes a primary piston for producing large volume at relatively low pressure and a smaller, secondary piston for producing higher pressure at smaller volume. The primary piston is moved directly by a brake rod and this piston, in turn, moves the secondary piston after a predetermined length of stroke. The hitch and actuator also include an accumulator which enables smoother operation, an improved break-away lever mechanism, and an improved brake fluid reservoir.

25 Claims, 7 Drawing Figures

FIG. 1

INVENTORS
JOSEPH L. WHERRY
EUGENE DeANGELIS
BY
Allen D. Gutchess, Jr.
ATTORNEY

FIG. 2

INVENTORS
JOSEPH L. WHERRY
BY EUGENE DeANGELIS

Allen D. Gutchess, Jr.
ATTORNEY

FIG. 4

INVENTOR.
JOSEPH L. WHERRY
BY EUGENE DE ANGELIS
Allen D. Gutchess, Jr.
ATTORNEY

FIG. 5

INVENTOR.
JOSEPH L. WHERRY
BY EUGENE DE ANGELIS

TRAILER HITCH AND BRAKE ACTUATOR

This invention relates to a trailer hitch and brake actuator for controlling movement of a trailer relative to a towing vehicle.

Although a number of types of trailer brake actuators are known in the art, the trailer brake actuator according to the invention has several improvements over those heretofore known. In particular, the new trailer brake actuator is capable of supplying brake fluid to the brakes of the towed vehicle under conditions of large volume and high pressure. This is achieved by the use of both a larger primary piston and a smaller secondary piston for the brake system. The primary piston is actuated through a piston or brake rod and, after a predetermined amount of movement, engages and moves the secondary piston. The primary piston, being larger, supplies a relatively large volume of brake fluid to the brakes, at relatively low pressure, whereas the smaller, secondary piston, when engaged and driven by the primary piston, supplies a smaller volume of high pressure brake fluid to the brakes. Means are provided to vent brake fluid pressure from the cylinder for the primary piston after it engages the secondary piston, to minimize the force required to drive the secondary piston, and means are also provided to rapidly supply brake fluid back to the reservoir upon the return stroke of the pistons. Means are further provided to pass brake fluid from the primary to the secondary cylinder and back again, the secondary chamber being equipped with an accumulator to enable a more gradual pressure rise of the brake fluid in the secondary cylinder. The secondary piston also is equipped with a relief valve for enabling the trailer to be backed up when desired.

The hitch also incorporates a break-away lever and mechanism which is more reliable in operation than many heretofore known, and a spill-proof brake fluid reservoir.

It is, therefore, a principal object of the invention to provide an improved hitch and brake actuator to be positioned between towed and towing vehicles, having the advantages and improvements outlined above.

Another object of the invention is to provide a trailer brake actuator capable of supplying brake fluid at both large volume and high pressure to the brakes of a towed vehicle.

A further object of the invention is to provide a trailer brake actuator having an accumulator and a relief valve enabling back-up of a towed vehicle with which the actuator is used.

Yet another object of the invention is to provide a trailer hitch and brake actuator with an improved break-away lever mechanism.

Still a further object of the invention is to provide a trailer brake actuator with an improved brake fluid reservoir.

Still another object of the invention is to provide an actuator capable of supplying fluid at large volume and high pressure with a relatively short stroke.

Other objects and advantages of the invention will be apparent from the following detailed description of a preferred embodiment thereof, reference being made to the accompanying drawings, in which:

Figure 1:
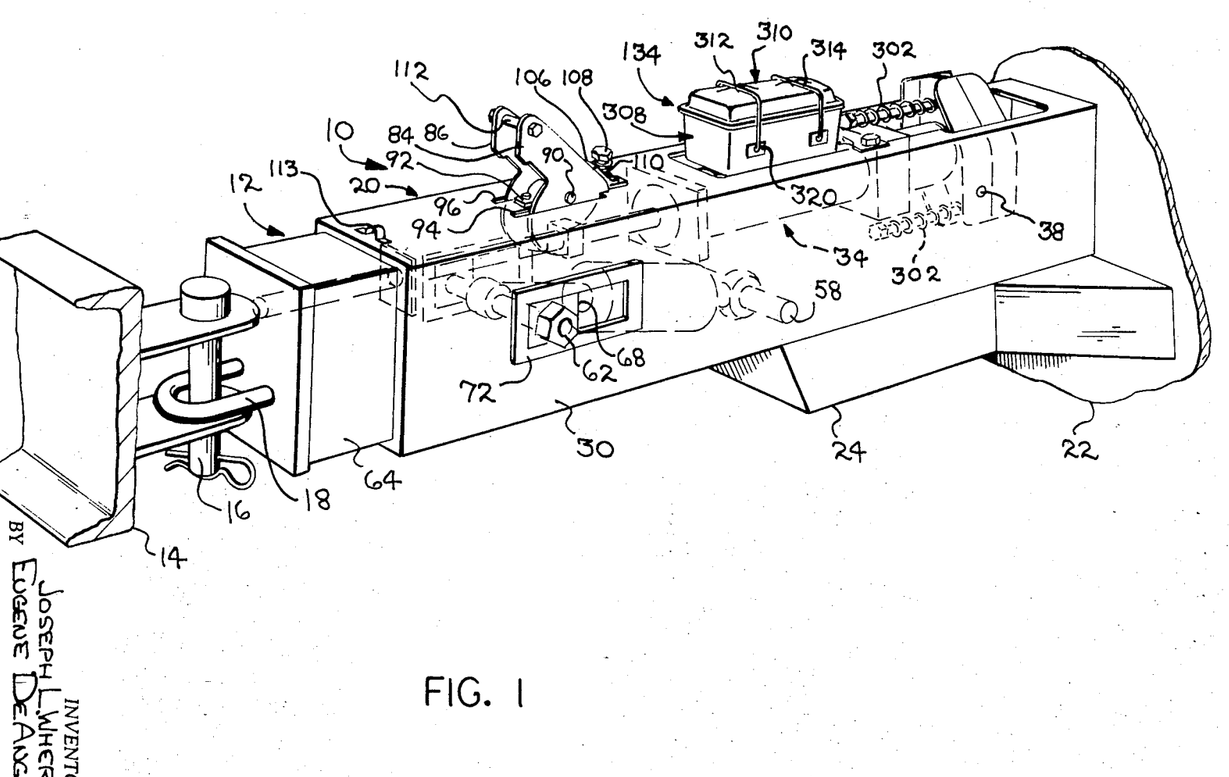
FIG. 1 is a somewhat schematic view in perspective of a trailer hitch and brake actuator according to the invention and portions of towing and towed vehicles connected by the hitch.

Referring to the drawings and particularly to FIG. 1, a trailer hitch and brake actuator embodying the invention is indicated at 10 and includes a front component 12 connected to a towing vehicle frame 14 by a pin 16 and a clevis or U-bolt 18, the later being welded or otherwise suitably affixed to the front end of the component 12. The hitch 10 also includes a rear component 20 which is suitably affixed to a towed vehicle or trailer 22, as by being welded or otherwise attached to a tongue 24 thereof.

Figure 2:
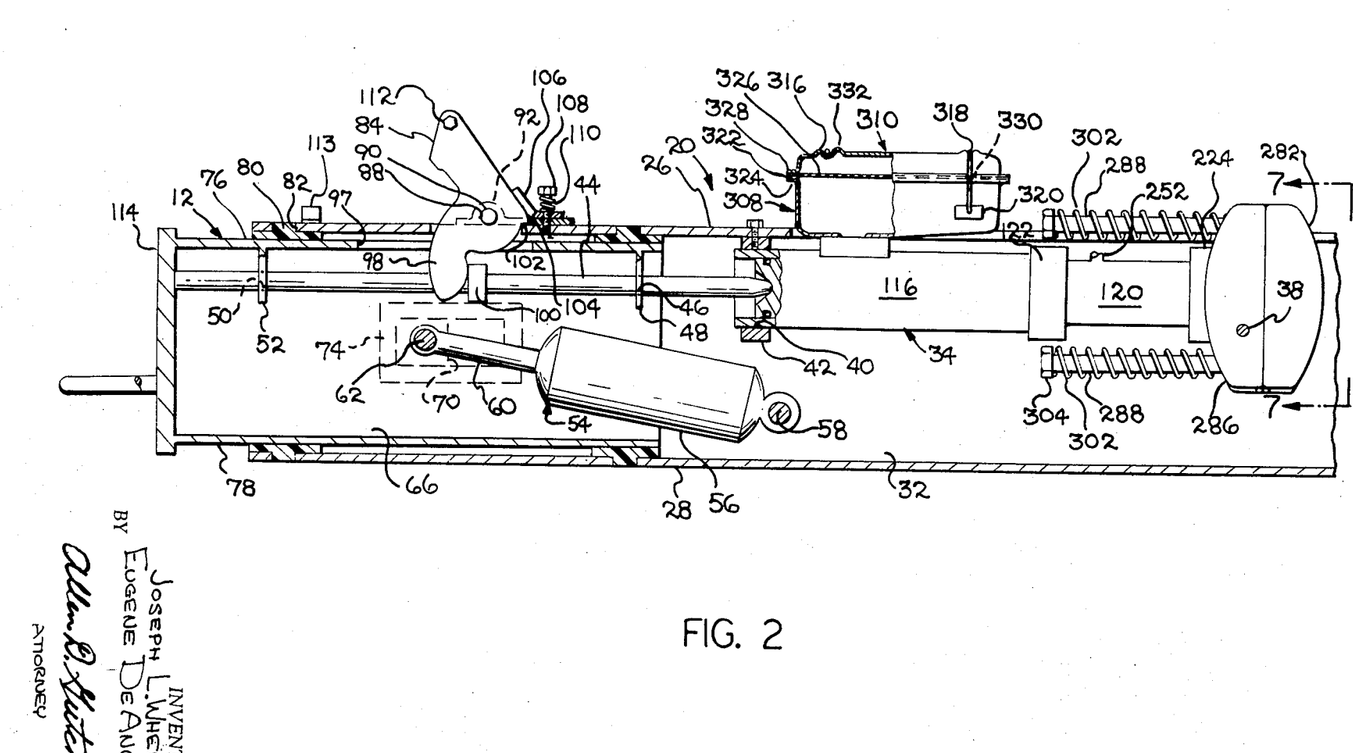
FIG. 2 is an enlarged view in longitudinal, vertical cross section of the overall trailer hitch with the brake actuator shown primarily in elevation.
Figure 7:
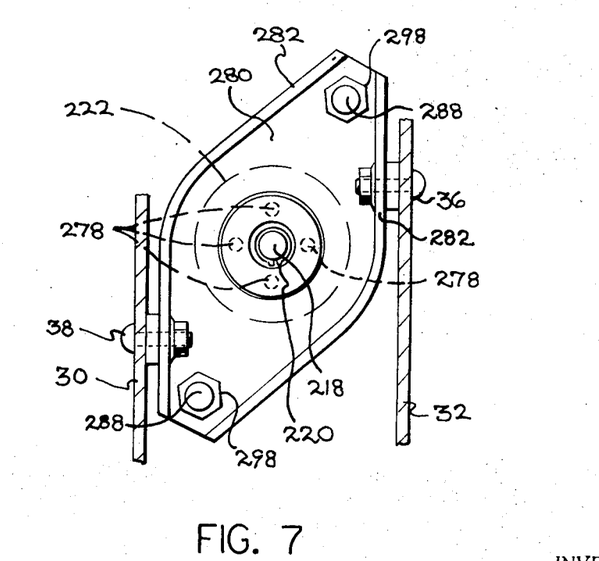
FIG. 7 is a rear view of the actuator taken along the line 7—7 of FIG. 2.

Referring also to FIG. 2, the rear component 20 includes upper and lower walls 26 and 28 and side walls 30 and 32. A brake actuator 34 is located in the component 20 and has a rear portion affixed to the side walls 30 and 32 by bolts 36 and 38 (see also FIG. 7). A forward portion of the unit 34 extends through an opening 40 in a bulkhead 42 which holds the actuator against transverse but not longitudinal movement. A brake or piston rod 44 extends through and is guided by an opening 46 in a rear bulkhead 48 and an opening 50 in a forward bulkhead 52.

A heavy-duty shock absorber 54 is mounted between the components 12 and 20 and dampens abrupt movement between the components 12 and 20 to provide smoother operation, as is known in the art. The shock absorber includes a cylinder 56 pivotally affixed to the side walls 30 and 32 of the component 20 by a bolt 58, and a rod 60 which is affixed to a bolt 62. This bolt extends beyond side walls 64 and 66 of the component 12 and is connected to square guide blocks 68 and 70. These are received in reinforced rectangular slots 72 and 74 extending longitudinally of the component 20 which limit movement of the bolt 62, and hence the component 12, in forward and rearward directions relative to the component 20.

The side walls 64 and 66 of the component 12 form a tubular construction with upper and lower walls 76 and 78, with the four walls 64, 66, and 76, 78 being slidably supported in the rear component 20 by plastic glide blocks 80 held in openings 82 of the component walls. There are four, two front and two rear, of the openings 82 and two of the plastic blocks 80 in each of the walls 26-32 of the component 20, each with two bosses received in two of the openings 82. These substantially reduce any binding and assure smooth operation of the hitch 10.

The break-away mechanism for the actuator 10 includes two substantially identical break-away levers 84 and 86 having openings 88 through which a common pivot pin 90 extends. The pin 90 is held by a central ear 92 affixed to the top wall 26 of the component 20 between slots 94 and 96 through which the levers 84 and 86 extend. The levers also extend through an upper opening 97 in the upper wall 76 of the forward component 12 so as not to interfere with the component 12 as it moves rearwardly and forwardly relative to the component 20. Each of the levers 84 and 86 includes a depending extension 98 located on one side of the brake rod 44 in front of a collar 100 affixed thereto. Each of the levers also has an offset or shoulder 102 projecting from a rear edge portion thereof, with an upper cam surface 104 thereabove which enables the lever to pivot past a stop 106. The stop 106 is resiliently mounted on the upper wall 26 by a machine screw 108 and a spring 110 so that the levers can move in a counterclockwise direction, as shown in FIG. 2, but are prevented from returning by the offsets 102 and the stop 106. When the levers are so pivoted, the extensions 98 engage the collar 100 and force the brake rod 44 rearwardly to set the brakes. When the levers are in the upright, at-rest position, the stop 106 holds them by exerting a clockwise force, urging the offsets 102 against the upper wall 26 at the ends of the slots 94 and 96.

An accumulator associated with the actuator 34 assures that the levers 84 and 86 will assume a position such that the shoulders 102 will be engaged by the stop 106 without placing excessive pressure on the brake fluid of the power unit. The levers 84 and 86 are moved in the counterclockwise direction preferably through a common cross bolt 112 which is attached to the towing vehicle by a suitable cable (not shown) extending through a guide 113 and which moves the levers in the event the towed vehicle becomes separated from the towing vehicle. The use of the two levers 84 and 86 help to assure that they act together with a balanced force on the collar 100 and be effective to set the brakes in the event of a break-away or separation of the vehicles. Further, the single shoulder 102 for each lever assures that both of the levers will be properly positioned by the stop 106 to fully set the brakes. Otherwise, the collar 100 is never engaged by the levers 84, 86 with the brake rod 44 being moved rearwardly only when the component 12 moves rearwardly so that the forward end of the rod 44 is so moved by a heavy front wall or plate 114 of the component 12 which the rod abuts.

Figure 3:
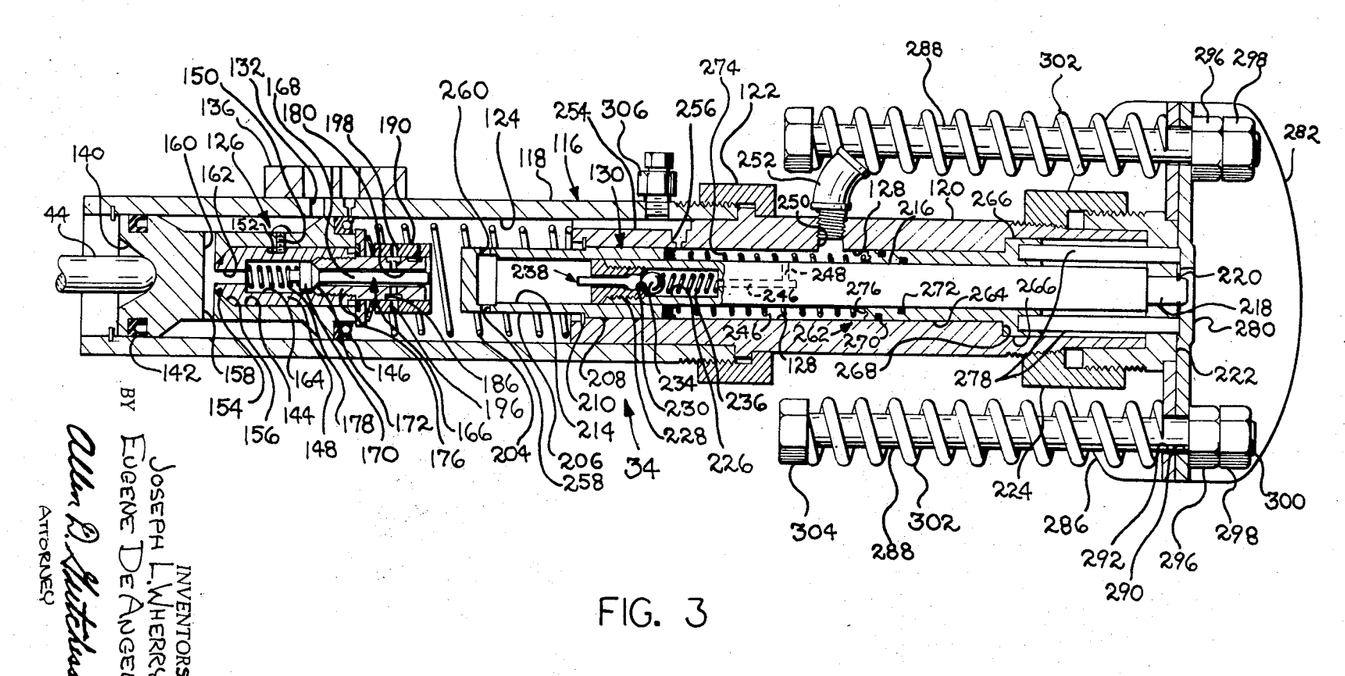
FIG. 3 is a further enlarged view in longitudinal cross section of the brake actuator embodied in the trailer hitch.
Figure 4:
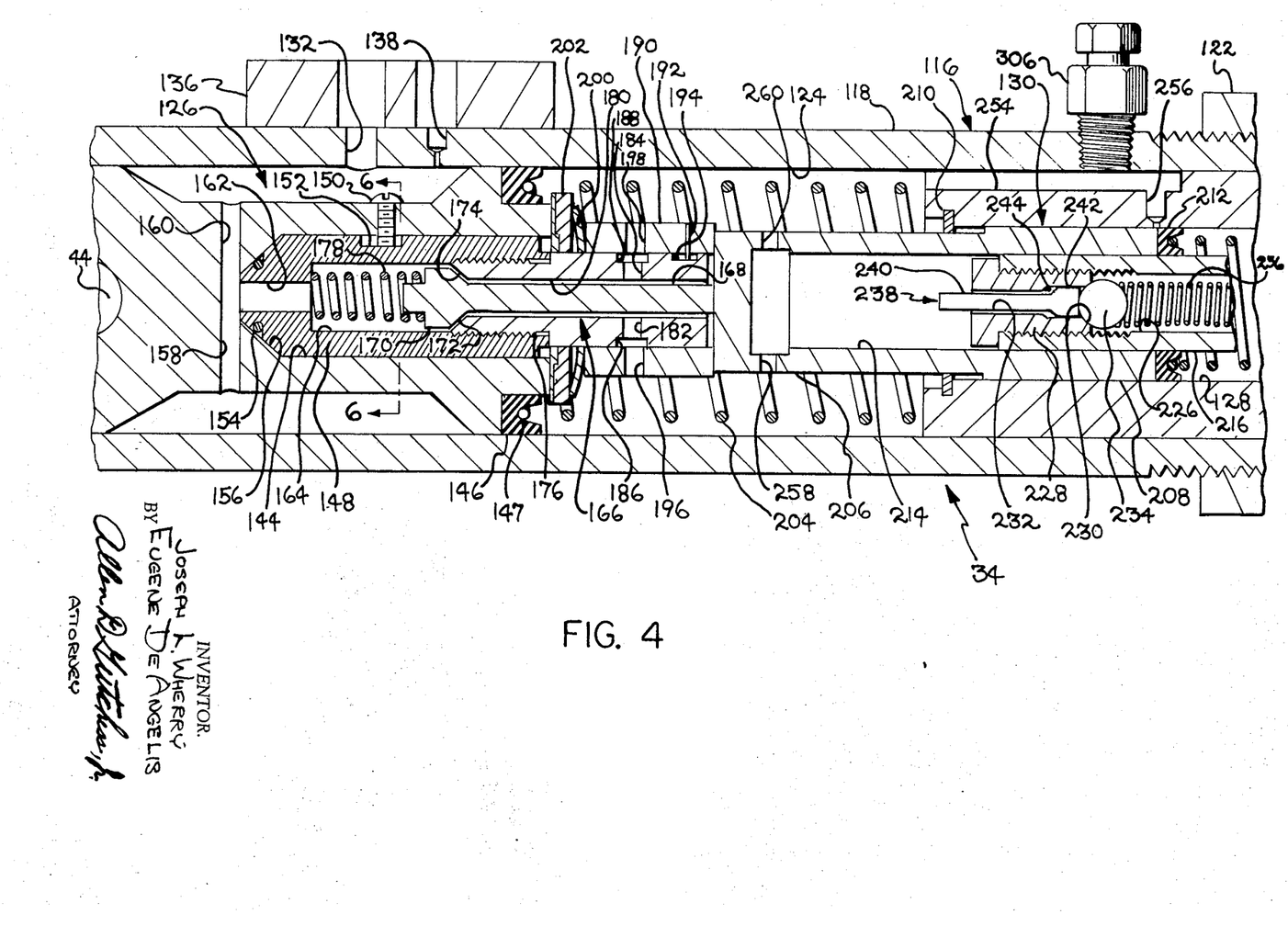
FIG. 4 is a further enlarged sectional view of primary and secondary pistons of the actuator of FIG. 3, shown with the primary piston moved into engagement with the secondary piston.
Figure 5:
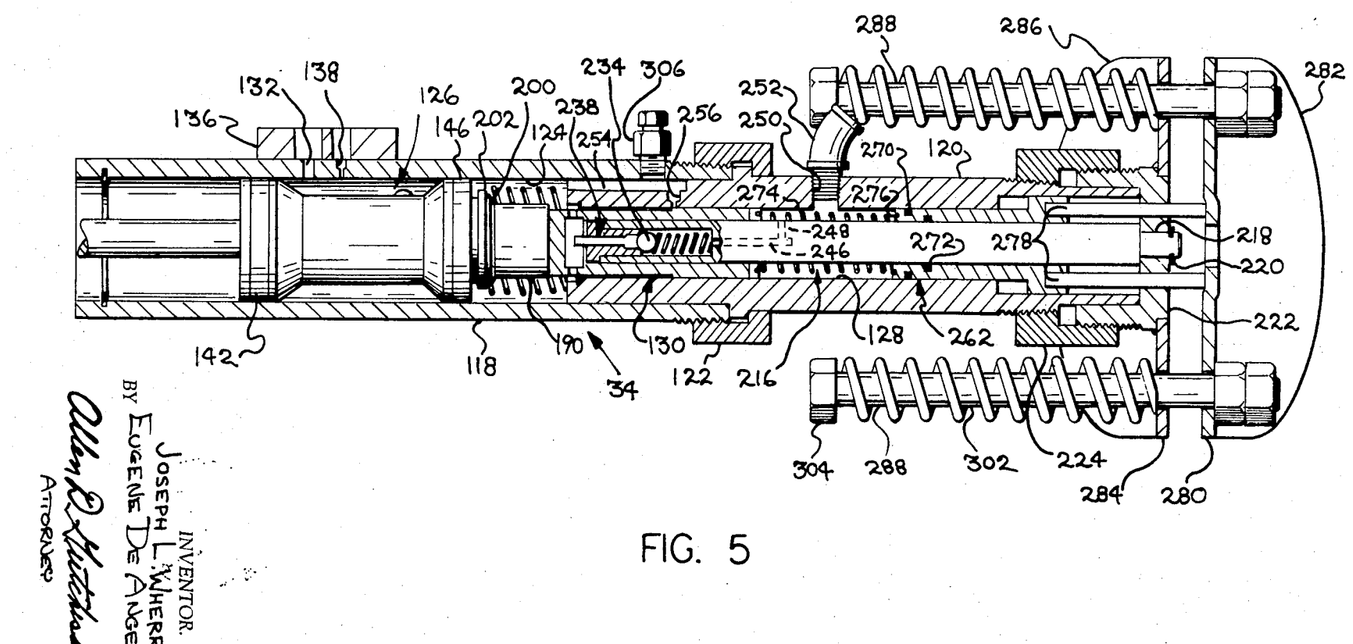
FIG. 5 is a longitudinal, sectional view similar to FIG. 3 but with both pistons moved further toward the right.
Figure 6:
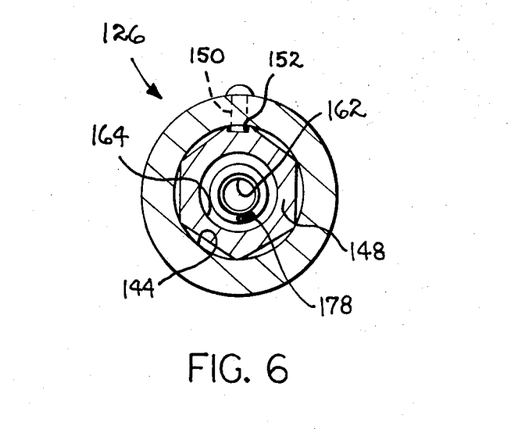
FIG. 6 is a view in transverse cross section through the primary piston, taken along the line 6—6 of FIG. 4.

Referring more particularly to FIGS. 3-5, the trailer brake actuator 34 comprises a housing 116 including a forward, generally-cylindrical part 118 and a rear, generally-cylindrical part 120 which are in telescoping relation and are joined by a collar 122. The forward end of the housing part 118 is slidably received in the bulkhead 42 while the back end portion of the rear housing part 120 is held by the bolts 36 and 38 (FIG. 7) in the side walls of the component 20. The forward housing part 118 forms a large primary cylinder or fluid chamber 124 containing a large primary piston 126 to supply a large volume of relatively low pressure fluid for the brake system of the trailer. The rear housing part 120 forms a smaller secondary cylinder or fluid chamber 128 containing a smaller secondary piston 130 which establishes lower volume, higher pressure fluid for the brake system.

The forward housing part 118 has a supply and return opening 132 therein communicating with a reservoir 134, to be discussed subsequently, which is mounted on a supporting block 136 above the actuator 34. A compensating port 138 is positioned rearwardly of the opening 132 and also communicates with the reservoir 134. The compensating port assures that the brakes will be released, functioning in a manner well known in the art.

The piston 126 has a conical recess 140 in the forward end to receive the rear end of the brake rod 44, with a sealing ring 142 also located at the forward end. A chamber 144 is formed in the rearward end of the piston 126 and a plastic sealing or "U" ring 146 with an annular groove 147 is located around the piston at the rearward end. A main check valve member 148 is located in the chamber 144 and is movable longitudinally therein to a limited extent, this being controlled by a stop pin 150 which extends into an elongate recess 152 in the valve member. As the piston 126 moves rearwardly, the check valve member 148 remains closed, as shown, with an O-ring 154 at the tapered, forward end being in contact with a valve seat 156 formed at the forward end of the chamber 144. However, when the piston 126 is moved in a return stroke, the valve member 148 is moved rearwardly relative to the piston, thereby unseating the O-ring 154 from the valve seat 156 and enabling rapid movement of brake fluid from the reservoir 134 to the cylinder 124, the valve being of hexagonal or other non-circular shape to provide ample passage therearound between it and the wall of the chamber 144.

Transverse passages 158 and 160 in the piston 126 communicate with that portion of the cylinder 124 between the sealing rings 142 and 146, which in turn is always in communication with the supply and return opening 132, for any position of the primary piston 126. The transverse passages 158 and 160 also communicate with a central passage 162 in the valve member 148 which connects with a larger passage 164 therein. The passages 162 and 164 are normally closed off by a valve member 166 comprising a stem 168 and an enlarged forward portion 170 forming a truncated conical valve surface 172. This surface 172 is normally urged against a valve seat 174 of a valve body 176 by a spring 178 located in the passage 164. The valve stem 168 is located in a larger bore 180 of the valve body 176 to provide an annular passage therebetween, communicating with transverse passages 182 and 184 of the valve body. These terminate in larger, outer passages 186 and 188 at the surface of the valve body.

A contact sleeve 190 is slidably mounted on that portion of the valve body 176 which extends rearwardly of the primary piston 126. Movement of the sleeve 190 on the body is limited by a pin 192 extending into an elongate recess 194 of the valve body 176. The sleeve 190 also has transverse holes or passages 196 and 198 which communicate in all positions of the sleeve with the terminal passages 186 and 188. The contact sleeve 190 is urged rearwardly by an annular resilient member or spring 200 which bears against the end of the contact sleeve and also against an annular wear plate 202. The annular resilient member 200 is shown in the form of a wave washer but can also assume the form of bowed or Belleville springs. With the contact sleeve 190 urged to the rearmost position by the spring 200, the rearward end of the sleeve extends slightly beyond the rearward end of the valve stem 168, as shown in FIG. 3.

As the primary piston 126 is moved rearwardly into the cylinder 124, fluid pressure is built up therein and applied to the brakes through passages to be discussed subsequently. When the piston rod 44 moves forwardly, the piston 126 returns to the forward position by a return spring 204 which seats in the groove 147 and also tends to expand the ring 146 outwardly to maintain good sealing relationship with the cylinder 124. During the return stroke, the check valve member 148 opens to enable fluid to flow from the reservoir 134 through the opening 132 and the passages 158 and 160 to the chamber 144 around the valve member 148 and into the cylinder 124.

The secondary piston 130 includes a smaller forward portion 206 and a larger rearward portion 208 forming a shoulder therebetween engaging a split ring 210 which constitutes a positive stop for the secondary piston when moving in a forward direction. The secondary piston has an annular face with a sealing ring 212, the piston having a large inner recess 214 which receives the end of a supporting rod 216. The rod 216 extends completely to the back end of the actuator 34 where it has an end 218 of reduced diameter held by a split ring 220 in an end cap 222. The end cap 222 is held in a fixed position relative to the housing 116 by a threaded rear collar 224.

The forward end of the supporting rod 216 has a longitudinally-extending recess 226 therein in which is threaded a valve body 228 having an annular valve seat 230 and a central passage 232. A spherical valve member or ball 234 is urged toward the seat 230 by a spring 236 located in the recess 226. A release pin 238 in the central passage 232 has a stem 240 and an enlarged portion 242 which cooperates with a shoulder 244 to hold the pin in the body 228. The valve member 234 is moved rearwardly to an open position by the pin 238 when it, in turn, is forced rearwardly.

When the valve member 234 is opened, fluid can flow through the recess 226, a longitudinally-extending passage 246 in the rod 216, and a transverse passage 248 in the rod into the cylinder 128. The fluid then moves toward a threaded opening 250 and an appropriate fitting 252 to the brakes of the towed vehicle.

Even when the valve member 234 is closed, fluid can pass from the primary cylinder 124 to the secondary cylinder 128 through a longitudinally-extending passage 254 in the telescoping portion of the housing part 120 and through a compensating port 256. The valve member 234 will open against the force of the relatively weak spring 236 when the pressure in the primary cylinder 124, or more accurately, the pressure differential across the valve member 234 exceeds a predetermined amount, e.g., 10 psi. Then fluid will flow from the cylinder 124 through transverse passages 258 and 260 in the secondary piston 130 and through the recess 214 past the valve member 234 and into the cylinder 128 through the passages 246 and 248. The valve member 234 also can be forced open mechanically when the secondary piston 130 moves rearwardly a sufficient distance.

The accumulator embodied in the actuator 34 includes an annular piston 262 having a smaller diameter portion 264 extending into the secondary cylinder 128 and an enlargement 266 abutting an annular shoulder 268 in the rear of the housing part 120. This limits maximum movement of the piston 262 in the cylinder 128. An outer O-ring 270 seals the outer surface of the piston with the wall of the cylinder 128 and an inner O-ring 272 seals the inner surface of the piston 262 with the rod 216. A return spring 274 is located between the pistons 130 and 262, being seated in an annular groove 276 in the ring 212.

Four guide rods 278 extend through the end cap 222 and are affixed to the enlargement 266 of the accumulator piston 266. These rods, in turn, abut a generally-diamond shaped plate 280 which extends transversely outwardly beyond the housing 116. The plate 280 has rearwardly extending flanges 282 for additional strength. A similarly shaped plate 284, adjacent the plate 280, is welded to the end cap 222 and has flanges 286 extending forwardly therefrom. A pair of spring-retaining rods 288 extend through openings 290 and 292 in the plates 280 and 284 and are held by nuts 296 and lock nuts 298 engaged with threaded portions 300 of the rods. Coil springs 302 are located around the rods 288 and are under compression between heads 304 and the forward surface of the plate 284. With this arrangement, rearward movement of the plate 280, along with the rods 278 and the piston 262, is resisted by the springs 302, such movement tending to place the springs 302 further in compression.

A bleeder valve 306 communicates with the brake fluid in the system through the passage 264 to bleed air from the fluid in the system from time to time, if necessary, as is known in the art.

The reservoir 134 is shown in more detail in FIGS. 1 and 2. The reservoir 134 includes a lower receptacle 308 and a cover 310. The cover is held on by two wire bails 312 and 314 which are received in notches 316 and 318 (FIG. 2) in the cover 310 and hook under projections 320 on the sides of the receptacle 308. A washer 322 is located on a lip 324 of the receptacle 308 and a partition 326 is positioned on the washer 322 and is engaged by a lip 328 of the cover 310. A liquid-tight contact is then made between the partition 326 and the receptacle 308 to prevent spilling of brake fluid in the receptacle. A vent hole 330 is formed in the partition 326 near the rear end of the reservoir 134 and a vent opening 332 is formed in the cover 310 near the forward end of the reservoir 134. This enables venting of the reservoir to be achieved with the chance of spilling of brake fluid held to a minimum.

The operation of the trailer hitch and brake actuator will now be described in detail. As the trailer moves toward the towing vehicle, the rear component 20 moves relative to the forward component 12 and causes the brake actuator 34 to move toward the piston rod 44. This moves the brake rod 44 into the actuator housing component 116. As the primary piston 126 is moved by the rod into the primary cylinder 124, the pressure of the brake fluid in the primary cylinder begins to rise. The check valve 148 is closed and is urged further closed as the pressure in the cylinder 124 builds up. Also, the valve member 166 is closed and remains so unless the pressure in the chamber 124 reaches a predetermined value, such as 150 psi, which is above the normal operating pressure. The pressure then acting on the valve member 166 would cause the valve surface 172 to move forwardly relative to the seat 174 and enables fluid to escape through the bore 180 to the recess 164, the passage 162, the transverse passages 158 and 160, and the passage 132 to the reservoir. The valve member 234 opens at a lower pressure, such as 100 psi, to enable brake fluid in the cylinder 124 to move through the transverse passages 258 and 260 in the secondary piston 130, into the chamber 214, and the passages 232, 246, and 248, to the secondary cylinder 128. Fluid will also move from the primary to the secondary cylinder through the passage 254 and the compensating port 256, regardless of the position of the valve member 234. Consequently, the pressure in the secondary cylinder 128 will be close to the pressure in the primary cylinder 124 by the time the primary piston 126 moves to the point where the contact sleeve 190 engages the forward end of the secondary piston 130.

When the sleeve 190 engages the secondary piston 130, this piston is moved rearwardly into the secondary cylinder 128 and as hydraulic pressure therein reaches a predetermined value, such as 150 psi, the sleeve 190 is moved forwardly relative to the primary piston 126, against the force of the annular resilient member 200. As the sleeve so moves, the end of the valve stem 168 engages the forward end of the secondary piston 130 and further movement of the primary piston 126 causes the valve member 166 to open. However, by the time the valve member 166 opens, the secondary piston 130 is moved rearwardly a sufficient distance that the piston ring 212 covers the port 256. This action prevents the possibility that the pressure in the secondary cylinder 128 will vent through the compensating port 256 and past the valve member 166, causing a loss, even though temporary, of brake fluid in the secondary cylinder 128. This position of the primary and secondary pistons with the secondary piston covering the compensating port 256 and the valve 166 beginning to open, is shown in FIG. 4.

Further movement of the brake rod 44 and the primary piston 126 causes the valve member 166 to open fully with the stem 168 flush with the rear face of the valve body 176 and the face of the sleeve 190 is also in the same plane. The valve member 166 thereby vents fluid from the primary cylinder 124 to eliminate back pressure which would unnecessarily resist rearward movement of the primary piston 126. The secondary piston 130 is then moved further into the secondary cylinder 128 causing a higher pressure rise at lower volume and further setting the brakes of the trailer. Prior to this, the high-volume, low-pressure fluid from the primary cylinder 124 will have caused preliminary setting of the brakes with this pressure being sufficient to take up any wear in the brake shoes or brake mechanism. The higher pressure fluid from the secondary cylinder 128 then enables the brakes to be set more fully, especially when disc brakes, requiring high pressure, are employed. Further, the combination high volume, low pressure and the high pressure, low volume enables the actuator to achieve both high volume and high pressure with a relatively low input force and a shorter stroke.

As the secondary piston 130 moves still further into the secondary cylinder 128, the pressure therein will rise to the point that the accumulator comes into action. At this time, the pressure acting on the accumulator piston 262 is sufficient to overcome the force of the compressive springs 302, thereby causing the piston 262, the guide rods 278, the plate 280, and the spring rods 288 to move rearwardly relative to the actuator, as shown in FIG. 5. By selecting the springs 302, and by adjusting the length of the rods 288 through the nuts 296 and 298, the pressure built up in the secondary cylinder 128 can be readily adjusted and controlled. Once a given pressure is reached, 2000 psi, for example, the accumulator piston 262 will move rearwardly at approximately the same rate as the primary piston 130 so that the pressure in the secondary cylinder 128 will build up relatively slowly and almost lineally, the build-up only being due to the further compression of the springs 302. This enables a much smoother operation of the brake actuator than in the case where no accumulator is used and the pressure in the cylinder rises abruptly.

As the trailer slows down relative to the towing vehicle and the piston rod 44 moves forwardly again, the springs 204 and 274 move the secondary piston 130 and the primary piston 126 forwardly. Fluid then passes from the primary cylinder 124 to the secondary cylinder 128 through the passage 254 and the port 256. The check valve member 148 also opens to enable rapid movement of brake fluid from the reservoir 134 back toward the primary cylinder 124.

When the trailer and towing vehicle are backed up, the primary piston 126 will move the secondary piston 130 into the secondary cylinder 128, building up pressure temporarily to a maximum as determined by the accumulator springs 302. The continued movement of the secondary cylinder 130, however, causes the end of the inner recess 214 to engage the pin stem 240 and force open the valve member 234. The valve member 234 is closed up to this time, of course, since the pressure in the secondary chamber 130 becomes equal to and then exceeds the pressure in the primary cylinder 124 during the rearward movement of the primary and secondary pistons. When the valve member 234 is mechanically forced open by the secondary piston, the fluid in the secondary cylinder 128 is passed through both of the pistons back toward the reservoir and enables the vehicle and trailer to back up with substantially no resistance afforded by the trailer brakes.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A hitch for connecting a towed and a towing vehicle, said hitch comprising two components movable relative to one another with one adapted to be connected to the towed vehicle and the other adapted to be connected to the towing vehicle, a brake actuator housing movable with one of the components, a primary chamber in said housing, a primary piston movable in said primary chamber, means movable with the other of the components and engageable with said primary piston for moving said primary piston in said primary chamber, a secondary chamber in said housing, a secondary piston in said secondary chamber and movable relative thereto, means establishing a supply of brake fluid for said primary chamber, means for supplying brake fluid from said primary chamber to said secondary chamber, means forming a passage for directing brake fluid from said secondary chamber toward a brake of the towed vehicle, and an accumulator comprising an accumulator piston extending into said secondary chamber and resilient means yieldably urging said accumulator piston into said secondary chamber.

2. A hitch according to claim 1 characterized further by a stationary pressure-responsive valve in said housing controlling flow of fluid through said means for supplying fluid from said primary chamber to said secondary chamber.

3. A hitch according to claim 1 characterized further by said secondary piston being engageable by said primary piston after said primary piston moves into said primary chamber a predetermined distance, a valve carried by said primary piston and openable after said primary piston begins to move said secondary piston to enable flow of brake fluid from said primary chamber toward said fluid supply.

4. A hitch according to claim 1 characterized by a check valve member carried by said primary piston and openable during a return stroke of said primary piston to enable the flow of fluid from said supply toward said primary chamber.

5. A trailer hitch comprising two components movable relative to one another and adapted to be connnected to a towed and a towing vehicle, a brake rod movable with one of the components and a brake actuator housing movable with the other of the components, said housing forming a primary chamber, a primary piston movable in said primary chamber and engageable by said brake rod, said housing forming a secondary chamber, a secondary piston movable in said secondary chamber and engageable by said primary piston after said primary piston moves into said primary chamber, said primary piston having contact means for engaging said secondary piston, means establishing a supply of fluid in communication with said primary chamber, a valve movable with said primary piston and enabling fluid to pass from said primary chamber toward said supply means when said valve is opened, said valve being opened after said contact means of said primary piston engages said secondary piston, means for supplying fluid to said secondary chamber, and means for directing fluid from said secondary chamber toward a brake of the towed vehicle.

6. A trailer hitch according to claim 5 characterized by said supply means for said secondary chamber comprises passage means formed by said brake actuator housing for supplying fluid from said primary chamber to said secondary chamber around said secondary piston, when said secondary piston is in a predetermined position.

7. A trailer hitch according to claim 6 characterized by resilient means associated with said contact means and effective to cause said primary piston to move said secondary piston to block said passage means before said valve is opened.

8. A trailer hitch according to claim 7 characterized by said contact means protruding beyond a stem of said valve which extends toward said secondary piston.

9. A trailer hitch according to claim 5 characterized by said primary chamber having a transverse area substantially exceeding that of said secondary chamber.

10. A trailer hitch according to claim 5 characterized further by accumulator means associated with said secondary chamber and yieldable therein when the pressure in said secondary chamber exceeds a predetermined value.

11. A trailer hitch according to claim 5 characterized further by said means for supplying fluid to said secondary chamber comprises passage means formed at least partly by said secondary piston for directing fluid between said primary and secondary chambers and additional valve means associated with said passage means for controlling flow therethrough.

12. A trailer hitch according to claim 11 characterized by said valve means being responsive to pressure and opening said passage means when the pressure differential between said primary and secondary chambers exceeds a predetermined amount.

13. A trailer hitch according to claim 11 characterized further by means holding said valve means stationary relative to said secondary piston whereby said secondary piston forces open said valve means when moved in said secondary chamber a predetermined distance.

14. A hitch for connecting towed and towing vehicles comprising two components movable relative to one another in response to relative movement between the towed and towing vehicles, a brake actuator housing movable with one of the components, a primary chamber in said housing, a primary piston movable in said primary chamber, means movable with the other of the components for moving said primary piston in said primary chamber, a secondary chamber in said housing, a secondary piston in said secondary chamber and movable relative thereto, means establishing a supply of fluid in communication with a portion of said primary chamber, said secondary piston having passage means enabling communication between said primary and secondary chamber a pressure-responsive valve in said housing for controlling flow of fluid through said passage means, said valve being opened when the pressure in said primary chamber exceeds the pressure in said secondary chamber by a predetermined amount, and means forming a passage for directing fluid from said secondary chamber toward a brake of the towed vehicle.

15. A hitch according to claim 14 characterized further by means supported by said housing for holding said valve in a stationary position relative to said secondary piston, said valve being engageable and opened by said secondary piston when said secondary piston has moved a predetermined distance relative to said secondary chamber.

16. A hitch according to claim 14 characterized further by resilient contact means positioned between said primary and secondary pistons and causing said primary piston to move said secondary piston when said primary piston has moved a predetermined distance into said primary chamber.

17. A hitch according to claim 14 characterized further by accumulator means associated with said secondary chamber and yieldable when the pressure in said secondary chamber exceeds a predetermined value.

18. A hitch according to claim 14 characterized further by an additional valve carried by said primary piston and openable to enable flow of fluid from said primary chamber toward said supply means after said primary piston engages said secondary piston.

19. A hitch according to claim 14 characterized further by additional passage means in said primary piston enabling flow of fluid therethrough, and a check valve member in said additional passage means openable only during a return stroke of said primary piston.

20. A hitch according to claim 19 characterized further by said secondary piston being engageable by said primary piston, and a valve carried by said check valve member and opened after said primary piston engages said secondary piston.

21. A trailer hitch comprising two components movable relative to one another with one adapted to be connected to a towed vehicle and the other to a towing vehicle, a brake rod movable with one of the components and a brake actuator housing movable with the other of the components, said housing forming a brake fluid cylinder, a piston movable in said cylinder and engageable by said brake rod, brake fluid supply means communicating with said cylinder on the brake rod side of said piston, said piston having a passage therethrough connecting portions of the cylinder on each side of the piston, said passage forming a valve seat at an intermediate portion thereof, a check valve member having a valve surface cooperating with said valve seat, said check valve member facing toward the portion of the cylinder opposite the brake rod side of the piston, and means cooperating with said piston and said check valve member for limiting the extent of movement of said check valve member in said passage.

22. A hitch according to claim 21 characterized further by an additional passage extending through said check valve member, and a valve carried by said check valve member in said additional passage.

23. A hitch according to claim 22 characterized by said valve in said check valve member comprising a check valve body mounted in said additional passage and forming a valve seat, and a valve member carried by said valve body and having a valve surface cooperating with said valve body seat.

24. A hitch according to claim 23 characterized further by said valve member having a stem extending into the cylinder beyond said check valve member and beyond said valve body, whereby said stem will open said valve when a force is applied thereto in a direction toward said piston.

25. A hitch according to claim 24 characterized by a second piston in said housing and movable therein when engaged by the first piston, said piston engaging said stem and opening said valve when the first piston moves a predetermined distance in said cylinder.

* * * * *